(12) United States Patent
Leigh et al.

(10) Patent No.: US 11,275,224 B2
(45) Date of Patent: Mar. 15, 2022

(54) CONNECTOR ASSEMBLY INCLUDING AN EDGE-ATTACHABLE OPTICAL CONNECTOR HOUSING AND OPTICAL CONNECTOR

(71) Applicant: HEWLETT PACKARD ENTERPRISE DEVELOPMENT LP, Houston, TX (US)

(72) Inventors: Kevin B. Leigh, Houston, TX (US); John Norton, Houston, TX (US); Michael R. Krause, Boulder Creek, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 264 days.

(21) Appl. No.: 16/195,085

(22) Filed: Nov. 19, 2018

(65) Prior Publication Data
US 2020/0158969 A1    May 21, 2020

(51) Int. Cl.
*G02B 6/42* (2006.01)
*H01R 12/72* (2011.01)

(52) U.S. Cl.
CPC ......... *G02B 6/4284* (2013.01); *G02B 6/4261* (2013.01); *G02B 6/4292* (2013.01); *H01R 12/721* (2013.01)

(58) Field of Classification Search
CPC .. G02B 6/4261; G02B 6/4292; G02B 6/4284; H01R 12/721
See application file for complete search history.

(56) References Cited

U.S. PATENT DOCUMENTS 6,234,817 B1    5/2001  Hwang
6,267,606 B1 *  7/2001  Poplawski ........... G02B 6/4246
                                              439/92

(Continued)

OTHER PUBLICATIONS

R.J. Pimpinella, "A New Type of Fiber Optic Connector Designed for Military Optical Backplanes," May 18-20, 1992, <https://ieeexplore.ieee.org/document/204271>.

*Primary Examiner* — Thomas A Hollweg
*Assistant Examiner* — Mary A El-Shammaa
(74) *Attorney, Agent, or Firm* — Nolte Lackenbach Siegel

(57) ABSTRACT

An edge-attachable (EA) optical connector includes an optical connector housing for an optical connector. The optical connector housing includes a slot that aligns with a module board edge finger electrical connector, such that the optical connector housing can be slid over a module board edge finger electrical connector and attached to the module board edge. An optical connector on one end of an optical fiber bundle or ribbon fits within the optical connector housing. When the optical connector housing is attached to the module board edge, the optical connector blind mates with a host optical connector supported by a bracket to which a host electrical connector is attached. An optical connector on another end of the optical fiber bundle or ribbon mates with a module board optical connector. The module board optical connector may include an optical socket mounted on an opto-electronic chip disposed on the module board. The EA optical connector can be easily attached to the module board edge such that it fits around the host electrical connector to allow for optical connectivity in addition to electrical connectivity.

19 Claims, 9 Drawing Sheets

(56) References Cited

U.S. PATENT DOCUMENTS

| | | | |
|---|---|---|---|
| 6,821,027 B2 * | 11/2004 | Lee | G02B 6/4249 |
| | | | 385/89 |
| 7,074,084 B2 | 7/2006 | Shuey | |
| 7,695,298 B2 | 4/2010 | Arndt | |
| 9,614,325 B2 | 4/2017 | Yuan | |
| 9,835,803 B2 | 12/2017 | Leigh et al. | |
| 2002/0110336 A1 * | 8/2002 | Dair | G02B 6/4256 |
| | | | 385/92 |
| 2013/0064498 A1 * | 3/2013 | Chou | G02B 6/4246 |
| | | | 385/14 |
| 2014/0064676 A1 * | 3/2014 | McColloch | G02B 6/425 |
| | | | 385/92 |
| 2015/0180578 A1 | 6/2015 | Leigh et al. | |

\* cited by examiner

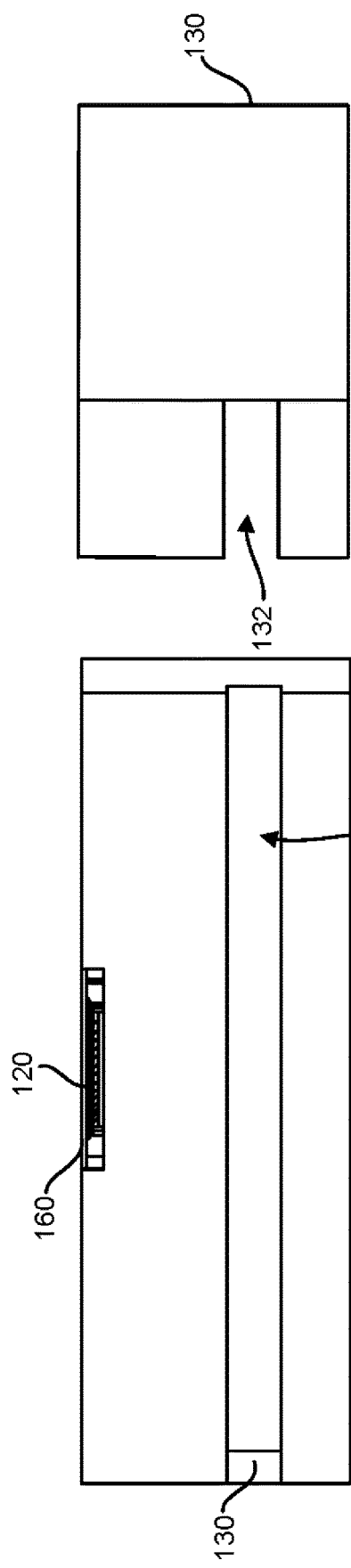
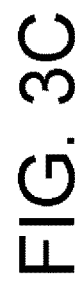
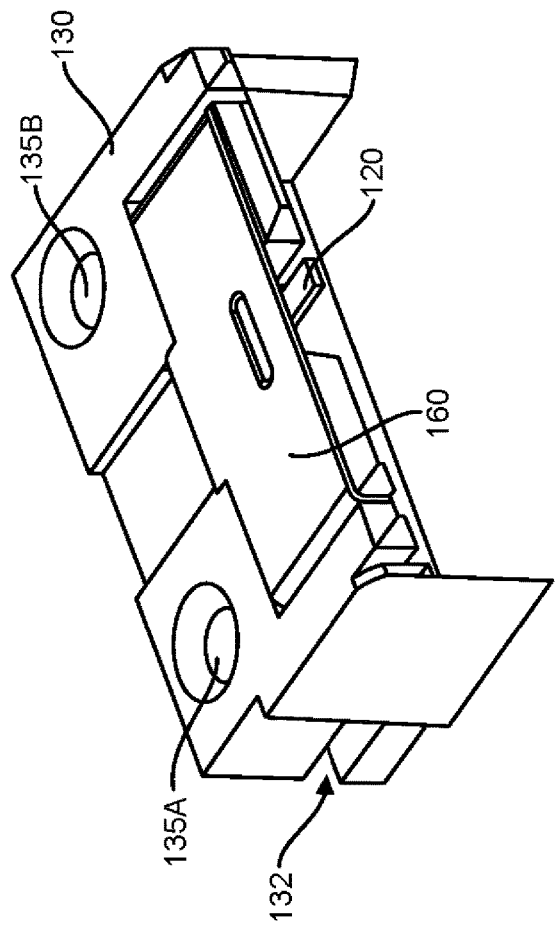

CONNECTOR ASSEMBLY INCLUDING AN EDGE-ATTACHABLE OPTICAL CONNECTOR HOUSING AND OPTICAL CONNECTOR

BACKGROUND

Electronic components are electrically connected via electrical connections for communicating electrical signals between the electronic components. Electronic components can also optically communicate with each other via optical connections so long as there is provided a way to convert between optical signals and electrical signals. For some applications, optical connections provide for greater bandwidth with lower power usage than electrical connections.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 3A is a front view of an optical connector housing according to one or more examples of the disclosure.

FIG. 3B is a side view of an optical connector housing according to one or more examples of the disclosure.

FIG. 3C is a perspective view of an optical connector housing according to one or more examples of the disclosure.

DETAILED DESCRIPTION

Figure 1:
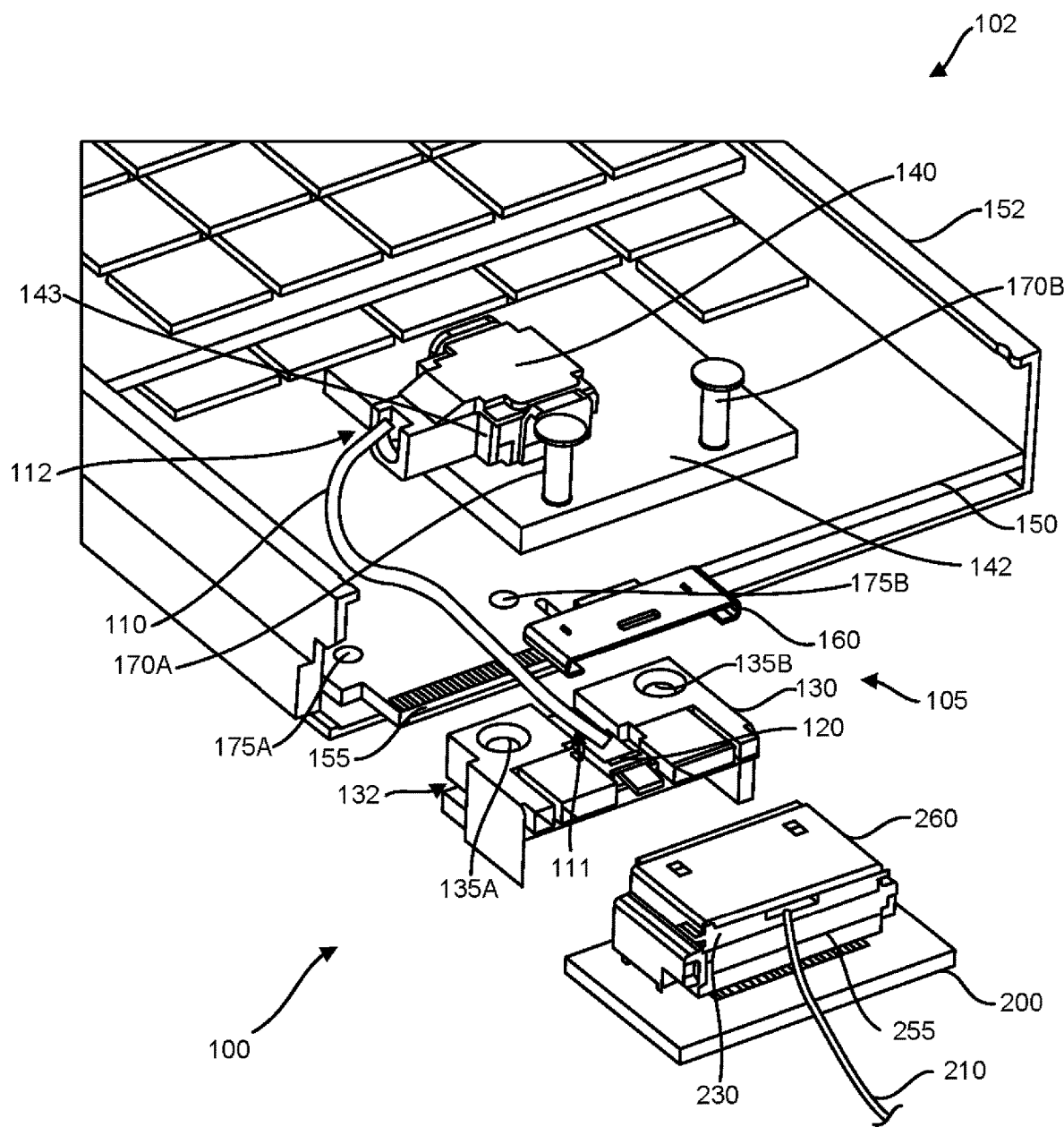
FIG. 1 is a perspective view of a system with a removable device and a connector assembly providing optical connectivity according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

A host system (such as an enterprise network, etc.) can include components that have connectors to establish communications with other components disposed on a host system board via the host system board. A connector can be used to communicatively couple electronic components, such as processors, memory devices, input/output devices, circuit boards, and so forth disposed on one or more removable device(s) to a host system board. A host system board can refer to a structure by which components of the host system are connected to other components of the host system. A module board can refer to a structure on which components can be mounted, where the structure can include communication channels (e.g., electrical traces, and so forth) to allow for communication among the components.

Connectors may be electrical connectors that have electrical contacts to allow components to communicate electrical signals and/or power. Additionally, connectors may be optical connectors that allow for high speed, high bandwidth optical communications between components and the system board.

The presence of both electrical and optical connectors can lead to various issues. For example, mounting both electrical and optical connectors on a module board and a host system board can occupy valuable space on the module board or the host system board. Also, providing both optical and electrical connectors in a host system can lead to complexities associated with installing components in the host system. Also, many existing computing systems primarily employ electrical connections and would benefit from optical connections even though the systems and their connections are already deployed.

While some connector assemblies have been proposed for including optical connectors and electrical connectors to connect components on a module board to components of a host system, such connector assemblies are inflexible in that the optical connectors are not easily attachable and are not backwards compatible to existing standard electrical connectors.

In accordance with illustrative examples, an edge-attachable ("EA") optical connector housing and an optical connector are employed to promote flexibility and ease of installing components in a system in which both electrical and optical communications are desired. The optical connector housing and optical connector are backwards compatible with existing standard electrical connectors. Additionally, the optical connector housing is aligned with the module board edge finger electrical connector, such that space occupied by the optical connector on the module board is minimized.

According to illustrative examples, a connector assembly of a removable device includes an optical connector housing with a slot positioned to align with a module board edge finger electrical connector. The connector assembly also includes an optical fiber bundle or ribbon having a first end and a second end. A first optical connector on the first end of the optical fiber bundle or ribbon at least partially fits within the optical connector housing. The first optical connector blind mates with a host optical connector disposed on a host system board. In some examples, a second optical connector on the second end of the optical fiber bundle or ribbon mates with an optical socket mounted on an opto-electronic chip disposed on a module board of the removable device. The optical socket may encapsulate laser and detector components that may be electrically coupled to the opto-electronic chip on the module board. In this manner, electrical connectivity and optical connectivity are provided between components disposed on or connected to the module board and components disposed on or connected to the host system board.

FIG. 1 is a perspective, partially exploded view of selected portions of a system 100 including a removable device 102 including a module board 150 to be assembled with a host system board 250 using a connector assembly 105 in accordance with one or more examples of the present disclosure. The removable device 102, the module board 150, and the host system board 250 are only partially shown in FIG. 1 so as not to obscure that which is claimed below. The assembly of the removable device 102, the module board 150, and the host system board 250 will result in both an electrical and an optical connection between components on the module board 150 and components on or connected to the host system board 250 as is discussed further below.

The connector assembly 105 includes an optical fiber bundle 110 providing optical connectivity between a module board optical connector (which may include an optical socket 143 mounted on an opto-electrical chip 142) and a host optical connector 220 (shown in FIG. 2) according to one or more examples of the disclosure. The optical fiber bundle 110 may have a protective jacket encasing multiple optical fibers. The optical fiber bundle 110 may be ribbonized on the ends but loose in the middle to allow for bending.

The optical fiber bundle 110 has a first optical connector 120 on a first end 111 and a second optical connector 140 on a second end 112. The first optical connector 120 at least partially fits within an optical connector housing 130. The first optical connector 120 may be at least partially covered by a retainer, such as a clamp 160, to secure the first optical connector 120 to the optical connector housing 130.

Figure 2:
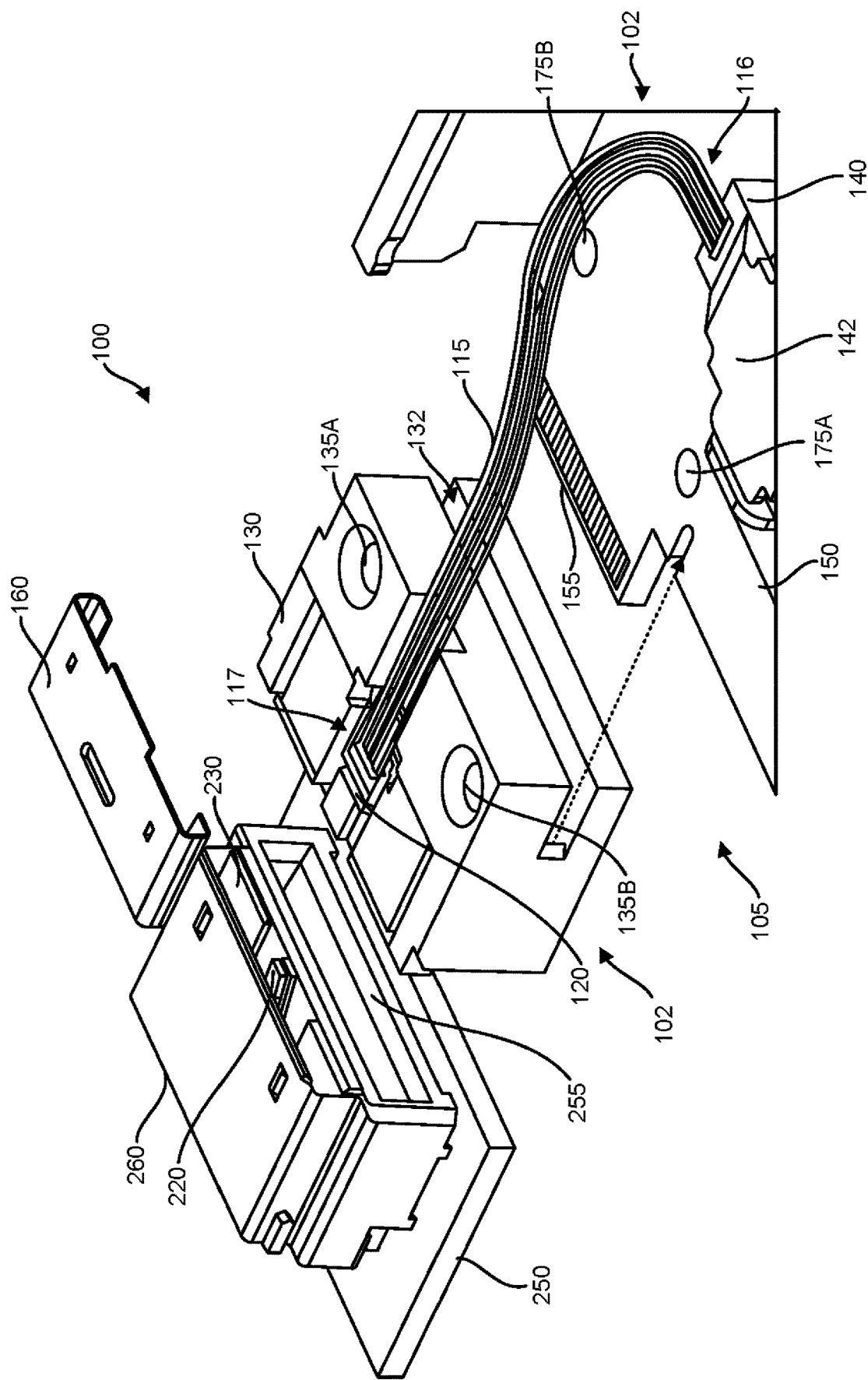
FIG. 2 is another perspective view of a system with a removable device and a connector assembly providing optical connectivity according to one or more examples of the disclosure.

Referring to FIGS. 1 and 2 collectively, the first optical connector 120 on the first end 111 is positioned within the optical connector housing 130 to blind mate with a host optical connector 220 (shown in FIG. 2). The host optical connector 220 is at least partially contained within a host optical connector housing 230 on a host system board 250. The first optical connector 120 includes at least one ferrule. The host optical connector 220 (shown in FIG. 2) also includes at least one ferrule. The host optical connector 220 connects to components of a host system via a host optical jumper 210.

In the system 100 shown in FIGS. 1 and 2, the second optical connector 140 on the second end 112 of the optical fiber bundle 110 mates with a module board optical connector that includes an optical socket 143 mounted on an opto-electronic chip 142. The opto-electronic chip 142 is disposed on the module board 150 of the removable device 102. In other examples, fibers within the fiber bundle 110 may mate with multiple optical connectors on the module board 150 or interface with polymer waveguides on the module board 150. The module board 150 is partially surrounded by a module board housing 152.

The optical connector housing 130 includes a slot 132 positioned to align with a module board edge finger electrical connector 155 extending outside the module board housing 152, such that optical connector housing 130 can slide over the module board edge finger electrical connector 155. The optical connector housing 130 includes housing holes 135A and 135B for receiving screws or pins 170A and 170B, respectively. The module board 150 includes mounting holes 175A and 175B for receiving the respective screws or pins 170A and 170B through the optical connector housing holes 135A and 135B, respectively. When the optical connector housing 130 is slid over the module board edge finger electrical connector 155, the screws or pins 170A and 170B fit through the housing holes 135A and 135B, respectively, to secure the optical connector housing 130 to the module board 150. In this manner, the optical connector housing 130 and the optical connector 120 are attached to the module board 150 over the module board edge finger electrical connector 155. Other retention mechanisms may be used in other examples.

The host electrical connector 255 and the host optical connector housing 230 are secured to the host system board 250 via, for example, a bracket 260. Once the optical connector housing 130 is attached to the module board 150, the bracket 260 can slip within the optical connector housing 130, such that the first optical connector 120 and the host optical connector 220 (shown in FIG. 2) within the host optical connector housing 230 can blind mate to provide optical connectivity between components disposed on or connected to the module board 150 and components disposed on or connected to the host system board 250. As the first optical connector 120 blind mates with the host optical connector 220, the host electrical connector 255 mates with the module board edge finger electrical connector 155 to provide electrical connectivity between the host system and the module board 150.

FIG. 2 is a perspective, exploded view of selected portions of the system 100 including the removable device 102 with the module board 150 to be assembled with the host system board 250 using the connector assembly 105 in accordance with one or more examples of the present disclosure. The system 100 and the connector assembly 105 include the same components shown in FIG. 1, except that the optical fiber bundle 110 is replaced with an optical fiber ribbon 115. The optical fiber ribbon 115 has a first optical connector 120 on a first end 116 and a second optical connector 140 on a second end 117.

Also shown in FIG. 2 is the host optical connector 220. As can be seen from FIG. 2, the host optical connector 220 is at least partially contained within the host optical connector housing 230.

Turning now to details of the optical connector housing 230, a front view and a side view of the optical connector housing 130 according to one or more examples of the disclosure are shown in FIGS. 3A and 3B, respectively. Additionally, a perspective view of an optical connector housing 230 according to one or more examples of the disclosure is shown in FIG. 3C.

As can be seen from FIGS. 3A-3C and as noted above, the optical connector housing 130 includes a slot 132. The slot 132 aligns with the module board edge finger electrical connector 155 of the module board 150 shown in FIGS. 1 and 2. The clamp 160 may cover the first optical connector 120 to secure the first optical connector 120 to the optical connector housing 130.

Figure 4:
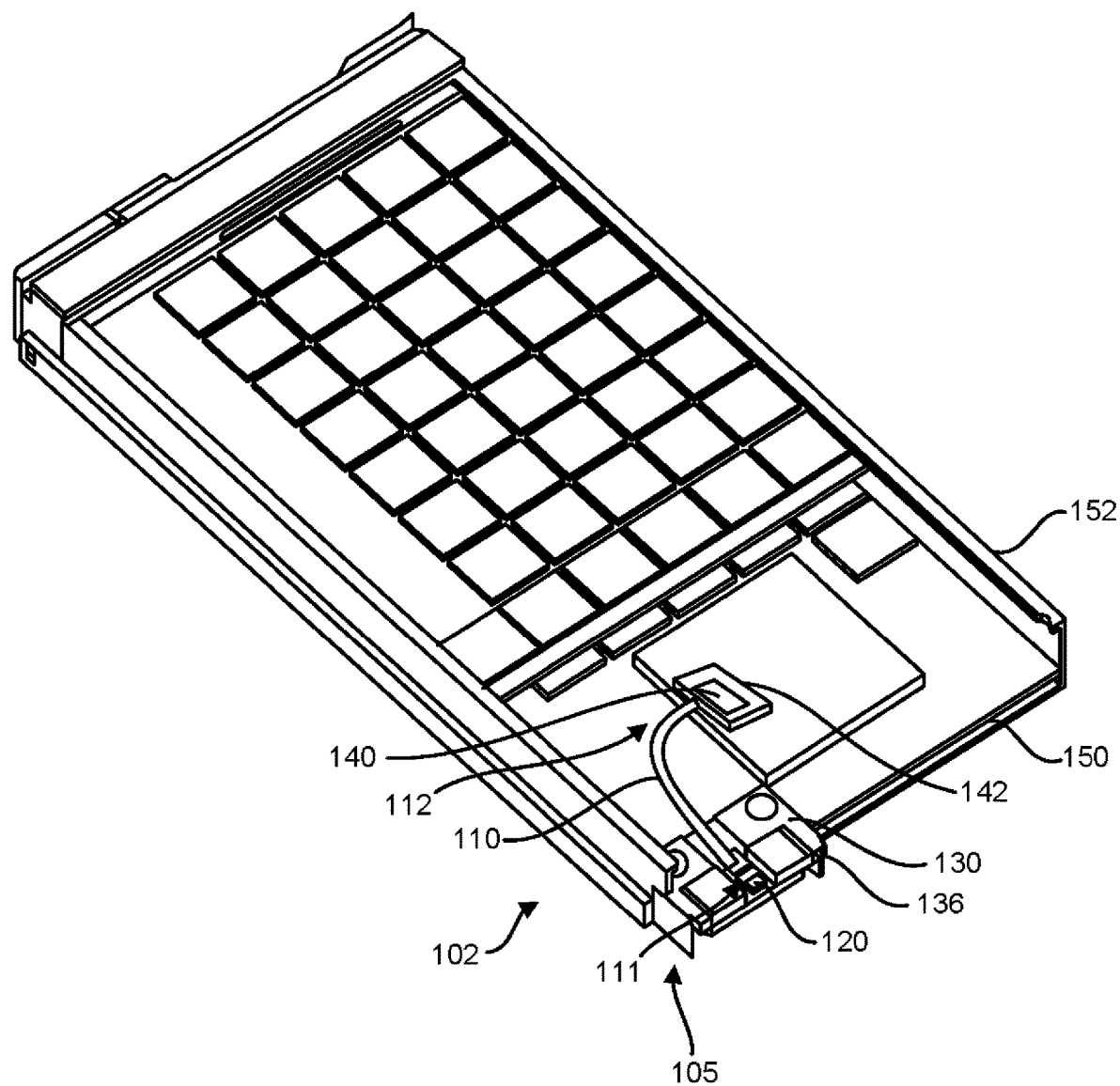
FIG. 4 is a perspective view of a removable device with a connector assembly connected to a module board according to one or more examples of the disclosure.

FIG. 4 is a perspective view of the removable device 102 with the connector assembly 105 and optical connector housing 130 connected to the module board 150 according to one or more examples of the disclosure. As shown in FIG. 4, the optical connector housing 130 is attached to the module board 150 that is partially contained within the module board housing 152. The first optical connector 120 on the first end 111 of the optical fiber bundle 110 is ready to blind mate with the host optical connector (not shown).

The second optical connector 140 on the second end 112 of the optical fiber bundle 110 is mated with the optical socket 143 (shown in FIG. 1) mounted on the opto-electronic chip 142. Although not shown in FIG. 4, a cover may be placed over the module board 150, with a portion 136 of the optical connector housing 130 and the module board edge finger electrical connector 155 (not shown) protruding therefrom.

Figure 5:
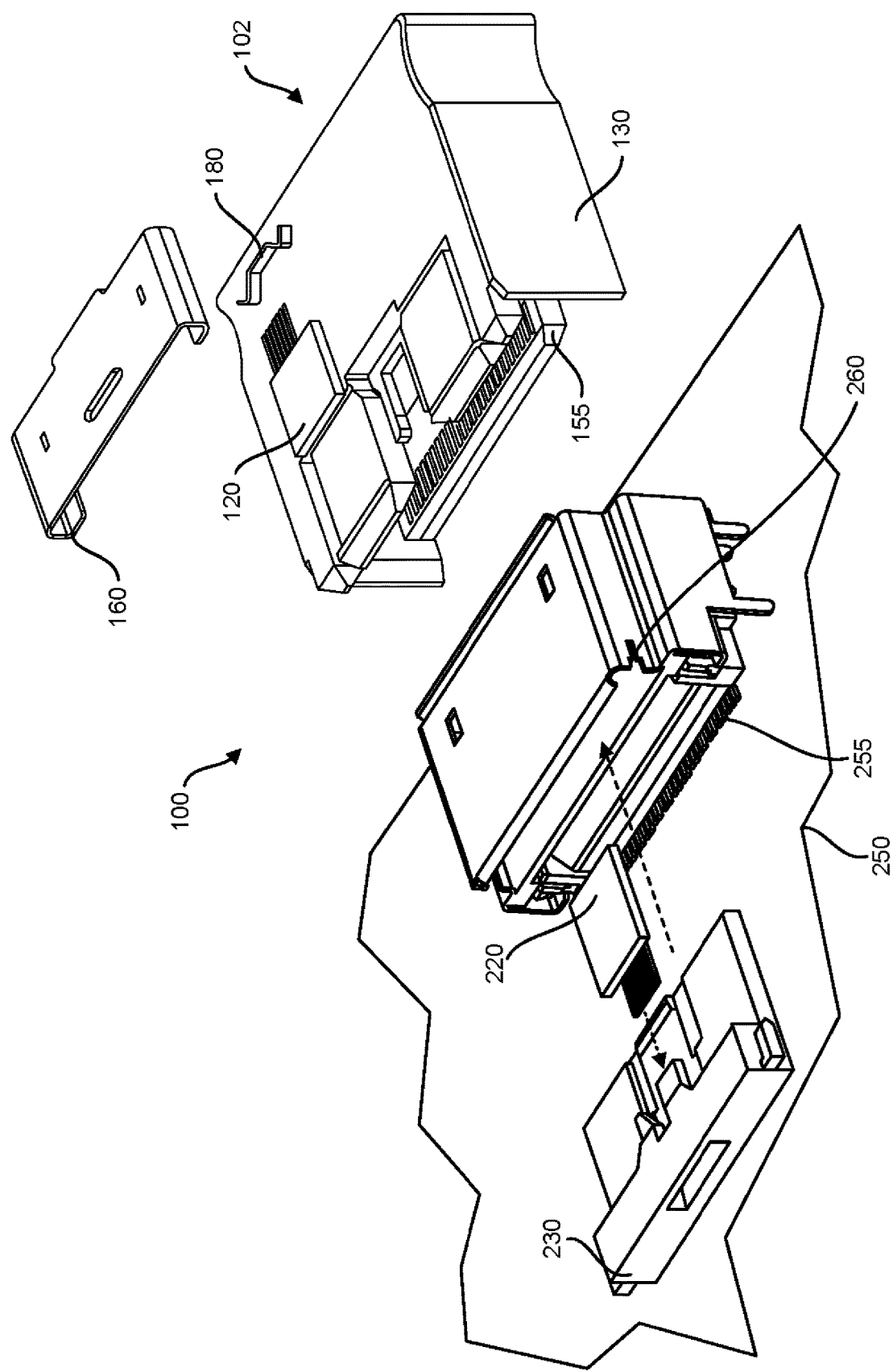
FIG. 5 is a detailed perspective view of a system with a removable device and a connector assembly providing optical connectivity according to one or more examples of the disclosure.

FIG. 5 is a detailed perspective view of a selected portion of a system 100 including a removable device 102 with a connector assembly 105 (shown in FIGS. 1 and 2) providing optical connectivity according to one or more examples of the disclosure. The perspective view shown in FIG. 5 is similar to that shown in FIGS. 1 and 2, except that further details of the optical connector housing 130 and the host optical connector housing 230 are shown. Some components are omitted from the system 100 shown in FIG. 5 for the sake of clarity.

As shown in FIG. 5, a spring 180 or other compression mechanism may be secured to, e.g., a surface of the optical connector housing 130. The spring 180 may be secured via the clamp 160 which secures the first optical connector 120 that at least partially fits within the optical connector housing 130. The spring 180 compresses to maintain blind mating of the first optical connector 120 with the host optical connector 220 and prevent overdrive as the module board edge finger electrical connector 155 mates with the host electrical connector 255. This is described in more detail below with reference to FIGS. 7A-7D. A spring is but one example of a compression mechanism that may be used.

As shown in FIG. 5, the host optical connector 220 at least partially fits within the host optical connector housing 230. The host optical connector housing 230 snaps into a bracket 260 to which host electrical connector 255 is attached. The host optical connector housing 230 may be snapped into the bracket 260 after the host electrical connector 255 is soldered to the bracket 260. The bracket 260 is attached to the host system board 250. As noted above with reference to FIG. 1, the bracket 260 slips within the optical connector housing 130, such that the first optical connector 120 and the host optical connector 220 can blind mate to provide optical connectivity between components disposed on or connected to the module board 150 and components disposed on or connected to the host system board 250. As the first optical connector 120 blind mates with the host optical connector 220, the host electrical connector 255 mates with the module board edge finger electrical connector 155 to provide electrical connectivity between the host system and the module board 150.

Figure 6:
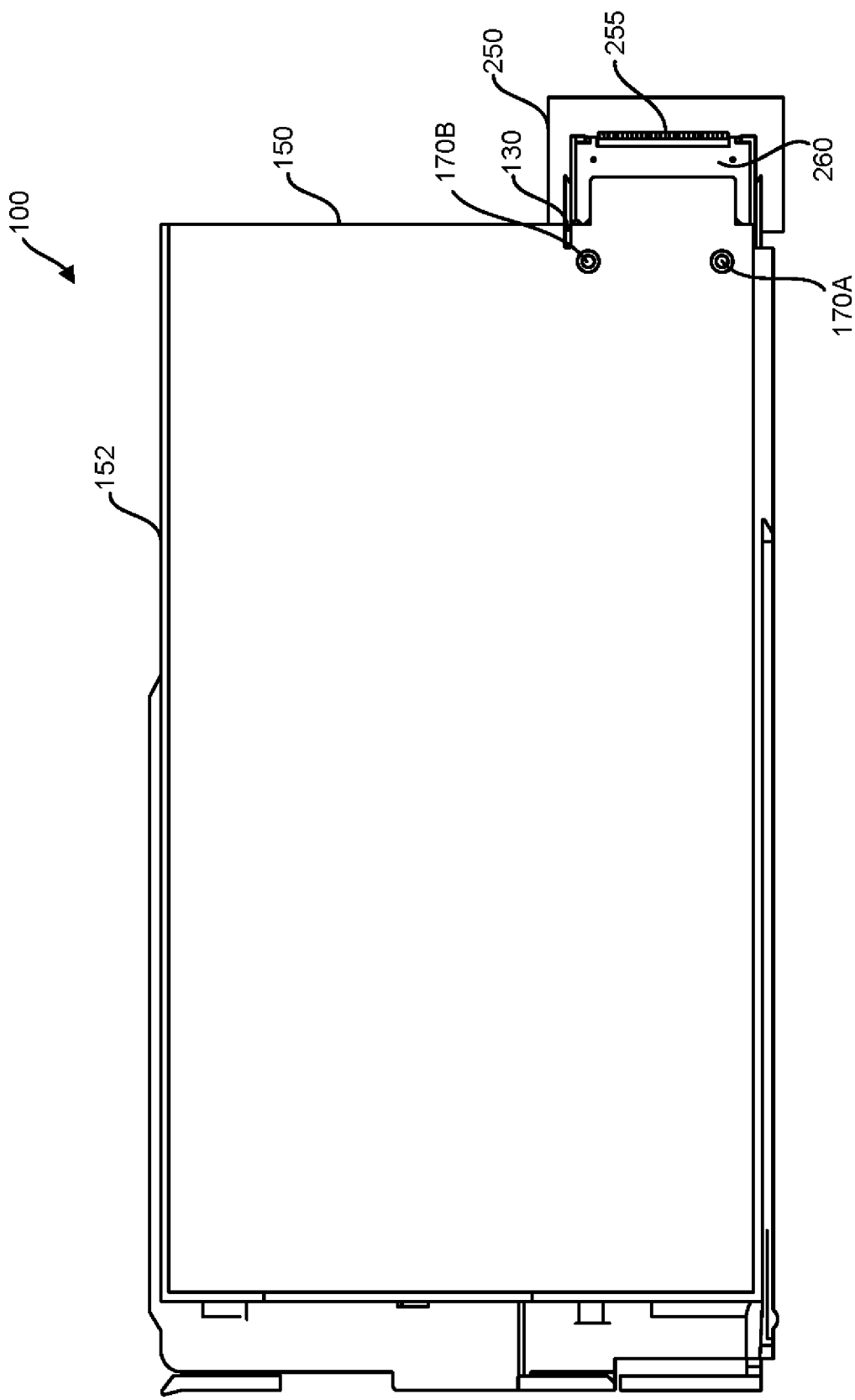
FIG. 6 is a cross-sectional top view of an assembled system providing optical and electrical connectivity according to one or more examples of the disclosure.

FIG. 6 is a cross-sectional top view of selected portions of an assembled system 100 providing optical and electrical connectivity. In the view shown in FIG. 6, some components disposed on the module board 150, such as the optical socket 143 and the opto-electronic chip 142, and some components of the connector assembly 105, such as the optical fiber bundle 110, the first optical connector 120 and the second optical connector 140, are not shown. Referring to FIG. 6, the optical connector housing 130 is secured to the module board 150 that is partially covered by the module board housing 152 via the screws or pins 170A, 170B. The second optical connector 140 (not shown) is mated with the optical socket 143 (not shown). The bracket 260 that secures the host electrical connector 255 and the host optical connector housing 230 to the host system board 250 is slipped within the optical connector housing 130. In this manner, the first optical connector 120 (not shown) and the host optical connector 220 (not shown) can blind mate to provide optical connectivity, and the host electrical connector 255 can mate with the module board edge finger electrical connector 155 (not shown) to provide electrical connectivity.

FIGS. 7A-7D are cross sectional side views showing stages of optical and electrical mating of selected portions of a system 100 including a removable device with a connector assembly according to one or more examples of the disclosure. FIGS. 7A-7D show components similar to those shown in FIGS. 1, 2, and 4-6, with some reference numbers and components omitted for clarity.

Figure 7A:
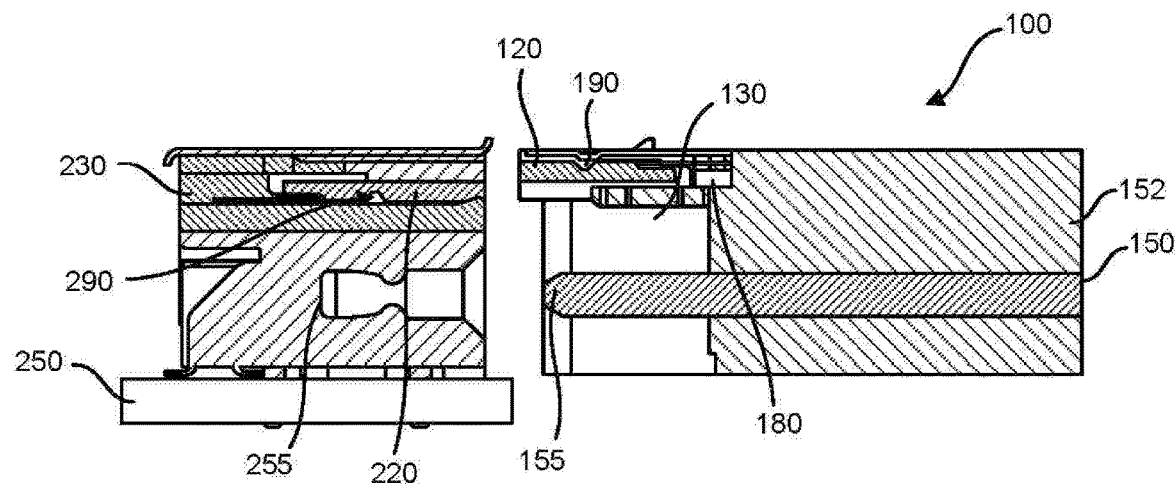
FIGS. 7A-7D are cross-sectional side views showing stages of optical and electrical mating of selected portions of a system including a removable device and a connector assembly according to one or more examples of the disclosure.

Referring to FIG. 7A, the optical connector housing 130 is attached to the module board 150, with the module board edge finger electrical connector 155 protruding from the module board housing 152. Although not shown, the second optical connector 140 is mated with the optical socket 143. An optical alignment lens 190 may be attached to the optical connector housing 130.

The host optical connector housing 230 within which the host optical connector 220 fits is attached to the bracket 260. Also attached to the bracket 260 is the host electrical connector 255. The bracket 260, in turn, is attached to the host system board 250. Also included is a host optical alignment lens 290 which may be attached to the host optical connector housing 230.

During the stage shown in FIG. 7A, the spring 180 is at rest, as mating has not yet begun. The first optical connector 120 is roughly aligned with the host optical connector 220.

Figure 7B:
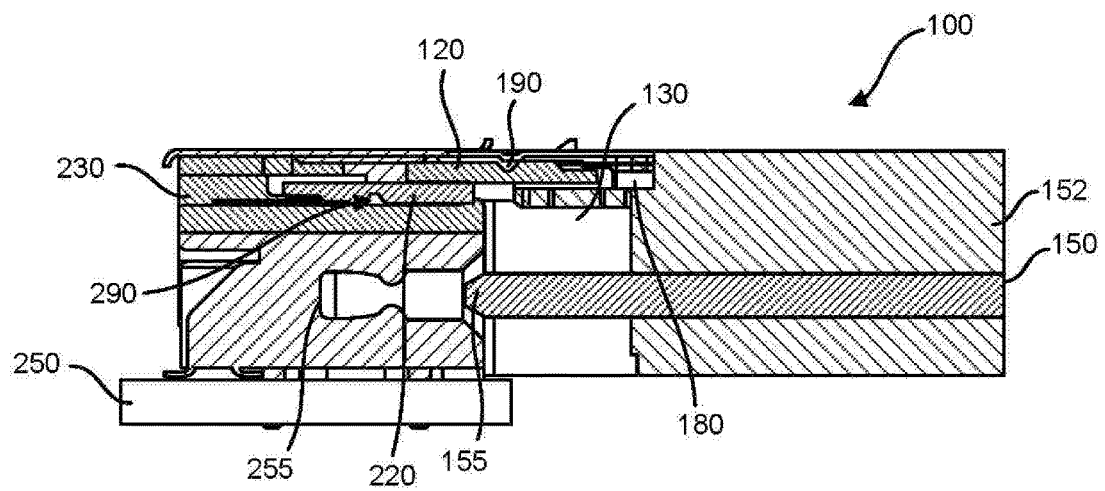

Referring to FIG. 7B, fine alignment occurs between the first optical connector 120 and the host optical connector 220 as blind mating of the first optical connector 120 and the host optical connector 220 begins. The first optical connector 120 and the host optical connector 220 may float within the optical connector housing 130 and the host optical connector housing 230, respectively, to allow for adjustments. At this stage, the module board edge finger electrical connector 155 has not yet mated with the host electrical connector 255, but the optical alignment lens 190 is moving towards alignment with the host optical alignment lens 290.

Figure 7C:
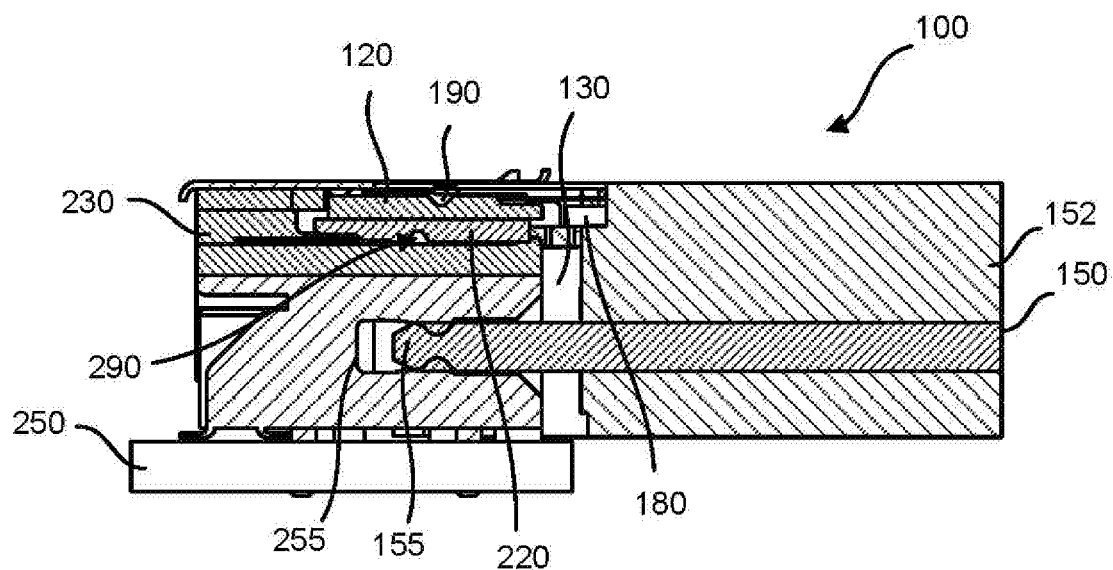

Referring to FIG. 7C, as the module board edge finger electrical connector 155 begins to mate with the host electrical connector 255, the first optical connector 120 and the host optical connector 220 press together, causing the spring 180 to begin to compress. At this stage, the module board edge finger electrical connector 155 is still not mated with the host electrical connector 255, but the optical alignment lens 190 moves closer towards alignment with the host optical alignment lens 290.

Figure 7D:
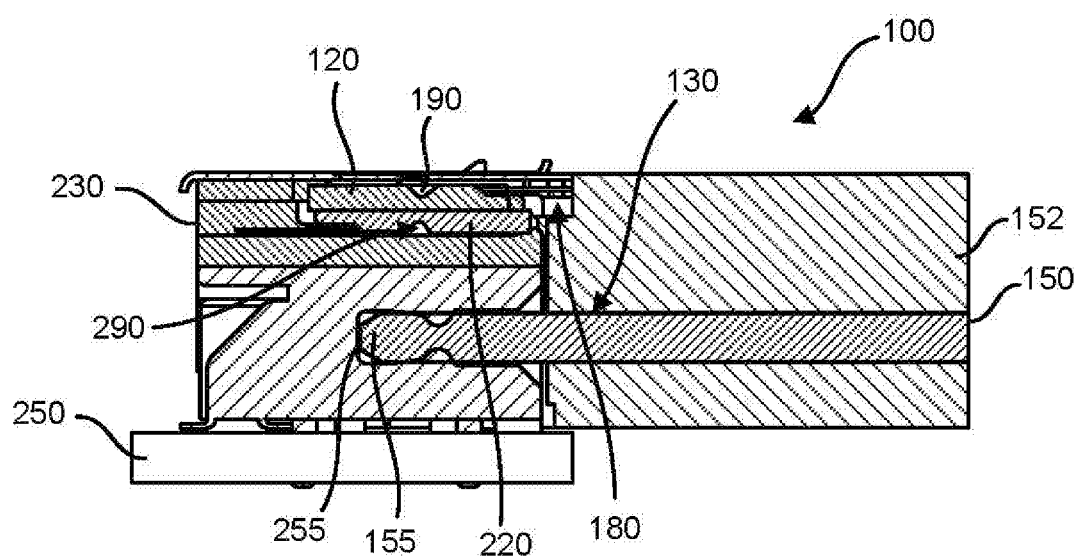
Figure 8:
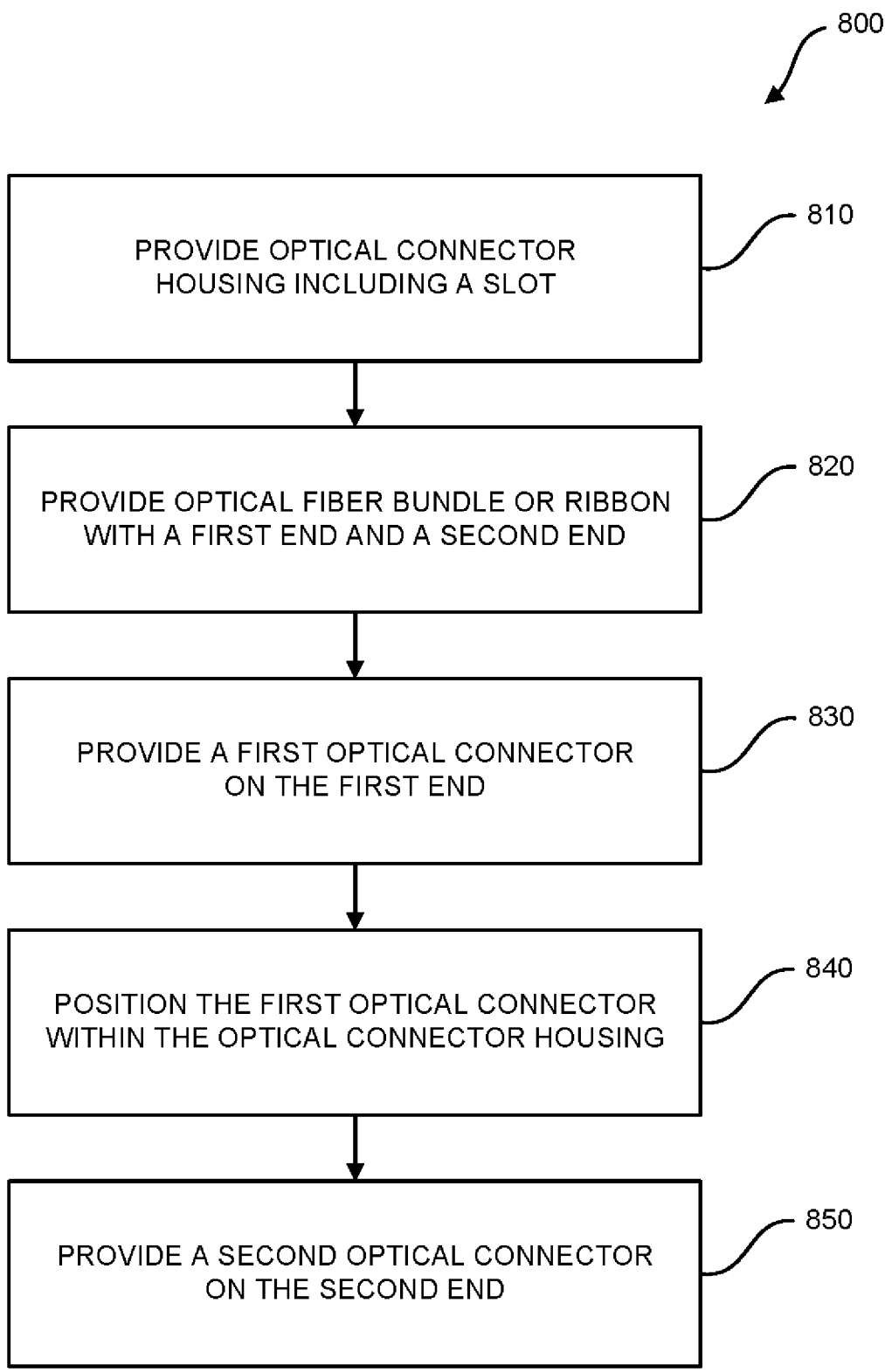
FIG. 8 is a flowchart depicting a method for forming a connector assembly according to one or more examples of the disclosure.

Referring to FIG. 7D, the module board edge finger electrical connector 155 mates with the host electrical connector 255. The optical alignment lens 190 is aligned with the host optical alignment lens 290. The spring 180 compresses more as the first optical connector 120 and the host optical connector 220 continue to press together. In this manner, the spring 180 maintains blind mating of the first optical connector 120 and the host optical connector 220 while preventing overdrive as the module board edge finger electrical connector 155 mates with the host electrical connector 255, FIG. 8 is a flowchart depicting a process for forming a connector assembly according to one or more examples of the disclosure. The process 800 provides (at 810) an optical connector housing including a slot positioned to align with a module board edge finger electrical connector. An optical fiber bundle or ribbon is provided (at 820) having a first end and a second end. A first optical connector is provided (at 830) on the first end of the optical fiber bundle or ribbon. The first optical connector at least partially fits within the optical connector housing. The first optical connector is positioned (at 840) within the optical connector housing to blind mate with a host optical connector. A second optical connector is provided (at 850) on the second end of the optical fiber bundle or ribbon to mate with a module board optical connector disposed on the module board.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A connector assembly, comprising:
   an optical connector housing including a slot to receive a module board edge finger electrical connector on a module board;
   an optical fiber bundle or ribbon having a first end and a second end;
   a first optical connector on the first end of the optical fiber bundle or ribbon that at least partially fits within the optical connector housing to blind mate with a host optical connector disposed on a host system board separate from the module board; and
   a second optical connector on the second end to mate with a module board optical connector.

2. The connector assembly of claim 1, wherein the optical connector housing is attachable to the module board.

3. The connector assembly of claim 1, wherein the first optical connector blind mates with the host optical connector as the module board edge finger electrical connector mates with a host electrical connector.

4. The connector assembly of claim 3, further comprising a compression mechanism attachable to the optical connector housing.

5. The connector assembly of claim 4, wherein the compression mechanism, in use, compresses as the module board edge finger electrical connector mates with the host electrical connector to maintain blind mating of the first optical connector with the host optical connector.

6. A method, comprising:
   providing an optical connector housing including a slot to receive a module board edge finger electrical connector on a module board;
   providing an optical fiber bundle or ribbon having a first end and a second end;
   providing a first optical connector on the first end of the optical fiber bundle or ribbon;
   positioning the first optical connector within the optical connector housing to blind mate with a host optical connector disposed on a host system board separate from the module board;
   providing a second optical connector on the second end of the optical fiber bundle or ribbon to mate with a module board optical connector.

7. The method of claim 6, wherein the optical connector housing is attachable to the module board.

8. The method of claim 7, wherein the first optical connector blind mates with the host optical connector as the module board edge finger electrical connector mates with a host electrical connector.

9. The method of claim 8, further comprising providing a compression mechanism attachable to the optical connector housing.

10. The method of claim 9, wherein the compression mechanism is compressible to maintain blind mating of the first optical connector with the host optical connector as the module board edge finger electrical connector mates with the host electrical connector.

11. A system, comprising:
    a module board;
    a module board optical connector;
    a module board edge finger electrical connector disposed on the module board;
    an optical connector housing including a slot to receive the module board edge finger electrical connector;
    an optical fiber bundle or ribbon having a first end and a second end,
    a first optical connector on the first end of the optical fiber bundle or ribbon, wherein the first optical connector is positioned within the optical connector housing and blind mates with a host optical connector disposed on a host system board separate from the module board; and
    a second optical connector on the second end of the optical fiber bundle or ribbon that mates with the module board optical connector.

12. The system of claim 11, wherein the module board optical connector comprises an optical socket mounted on an opto-electronic chip disposed on the module board.

13. The system of claim 11, wherein the optical connector housing is attachable to the module board.

14. The system of claim 13, further comprising a retainer to retain attachment of the optical connector housing to the module board.

15. The system of claim 11, wherein the first optical connector blind mates with the host optical connector as the module board edge finger electrical connector mates with a host electrical connector.

16. The system of claim 15, further comprising a compression mechanism attachable to the optical connector housing.

17. The system of claim 16, wherein the compression mechanism is compressible to maintain blind mating of the first optical connector with the host optical connector as the module board edge finger electrical connector mates with the host electrical connector.

18. The system of claim 15, wherein the host optical connector is at least partially contained in a host optical connector housing.

19. The system of claim 18, wherein the host optical connector housing is attachable to a bracket to which the host electrical connector is attached.

* * * * *